United States Patent
Fortier et al.

(10) Patent No.: US 8,907,505 B2
(45) Date of Patent: Dec. 9, 2014

(54) METHOD AND APPARATUS FOR GENERATING ELECTRICAL ENERGY

(75) Inventors: John Douglas Fortier, Ransomville, NY (US); Lawrence Charles Grumer, Rochester, NY (US)

(73) Assignee: Energy Harvesters LLC, Rochester, NY (US)

( * ) Notice: Subject to any disclaimer, the term of this patent is extended or adjusted under 35 U.S.C. 154(b) by 0 days.

(21) Appl. No.: 13/565,826

(22) Filed: Aug. 3, 2012

(65) Prior Publication Data

US 2013/0033042 A1     Feb. 7, 2013

Related U.S. Application Data

(60) Provisional application No. 61/574,423, filed on Aug. 3, 2011.

(51) Int. Cl.
| | | |
|---|---|---|
| H02P 9/04 | (2006.01) | |
| A43B 3/00 | (2006.01) | |
| A43B 7/04 | (2006.01) | |
| F03G 5/06 | (2006.01) | |
| F03G 7/08 | (2006.01) | |

(52) U.S. Cl.
CPC ............. *A43B 3/001* (2013.01); *A43B 3/0015* (2013.01); *A43B 7/04* (2013.01); *F03G 5/06* (2013.01); *F03G 7/08* (2013.01)
USPC ........................................................ 290/1 R

(58) Field of Classification Search
CPC ..................................................... H02K 11/00
USPC ............................................ 290/1 R; 310/30
See application file for complete search history.

(56) References Cited

U.S. PATENT DOCUMENTS

| | | | | | |
|---|---|---|---|---|---|
| 1,506,282 | A | * | 8/1924 | Barbieri ...................... | 310/75 B |
| 4,473,751 | A | * | 9/1984 | Rombach et al. ............ | 290/1 R |
| 4,674,199 | A | * | 6/1987 | Lakic ............... | 36/2.6 |
| 4,782,602 | A | * | 11/1988 | Lakic ............... | 36/2.6 |
| 4,845,338 | A | * | 7/1989 | Lakic ............... | 219/211 |
| 5,343,190 | A | * | 8/1994 | Rodgers ................... | 340/573.1 |
| 5,347,186 | A | * | 9/1994 | Konotchick .................. | 310/17 |
| 5,495,682 | A | * | 3/1996 | Chen .................. | 36/2.6 |
| 5,818,132 | A | * | 10/1998 | Konotchick .................. | 310/17 |

(Continued)

FOREIGN PATENT DOCUMENTS

| | | |
|---|---|---|
| CA | 2676007 A1 | 2/2011 |
| CN | 201165928 Y * | 12/2008 |

(Continued)

*Primary Examiner* — Joseph Waks
(74) *Attorney, Agent, or Firm* — Burns & Levinson LLP; Orlando Lopez

(57) ABSTRACT

An apparatus and a method are provided for obtaining electrical power from activities, e.g., walking and running, of a user. In one example, the apparatus includes first and second compressible bladders; a fluid containing column coupled between the first and second compressible bladders; a magnetic piston disposed in the fluid containing column, the magnetic piston being shaped to conform with an internal cross section of the cylinder and movable in the cylinder along a longitudinal direction of the cylinder, wherein the magnetic piston comprises a plurality of magnets with similar poles facing each other and separated by one or more pole pieces, the magnets being axially magnetized along the longitudinal direction; one or more wire windings disposed proximate the magnetic piston; and an electric charge storage electrically coupled to said one or more wire windings.

23 Claims, 7 Drawing Sheets

(56) References Cited

U.S. PATENT DOCUMENTS

| | | | |
|---|---|---|---|
| 6,182,378 B1 * | 2/2001 | Sendaula | 36/29 |
| 6,201,314 B1 * | 3/2001 | Landry | 290/54 |
| 6,230,501 B1 * | 5/2001 | Bailey et al. | 62/51.1 |
| 6,239,501 B1 * | 5/2001 | Komarechka | 290/1 R |
| 6,255,799 B1 * | 7/2001 | Le et al. | 320/107 |
| 6,744,145 B2 * | 6/2004 | Chang | 290/1 R |
| 7,327,046 B2 * | 2/2008 | Biamonte | 290/1 R |
| 7,956,476 B2 | 6/2011 | Yang | |
| 7,956,753 B2 * | 6/2011 | Fogg | 340/573.1 |
| 8,013,463 B2 * | 9/2011 | Preston | 290/54 |
| 8,468,722 B2 * | 6/2013 | Battlogg et al. | 36/88 |
| 8,629,572 B1 * | 1/2014 | Phillips | 290/53 |
| 2003/0034697 A1 * | 2/2003 | Goldner et al. | 310/17 |
| 2005/0081804 A1 * | 4/2005 | Graf et al. | 123/46 E |
| 2005/0206247 A1 * | 9/2005 | Stewart et al. | 310/12 |
| 2008/0084121 A1 * | 4/2008 | Kelly | 310/12 |
| 2008/0127510 A1 * | 6/2008 | Yang | 36/29 |
| 2009/0101005 A1 * | 4/2009 | Pohl et al. | 92/85 B |
| 2010/0117367 A1 * | 5/2010 | Muller et al. | 290/53 |
| 2010/0277012 A1 * | 11/2010 | Kobayashi | 310/30 |
| 2011/0037349 A1 | 2/2011 | Sham et al. | |
| 2011/0204653 A1 * | 8/2011 | Liu et al. | 290/1 R |
| 2013/0020986 A1 * | 1/2013 | Linzon et al. | 320/107 |
| 2013/0028368 A1 | 1/2013 | Oshio | |
| 2013/0057085 A1 * | 3/2013 | Sugita et al. | 310/12.18 |

FOREIGN PATENT DOCUMENTS

| | | | |
|---|---|---|---|
| CN | 202184220 U | | 4/2012 |
| DE | 2355728 A | * | 5/1975 |
| GB | 2465423 A | * | 5/2010 |
| WO | WO 0145977 A2 | * | 6/2001 |
| WO | WO 2009098970 A1 | * | 8/2009 |
| WO | WO 2010000316 A1 | * | 1/2010 |

* cited by examiner

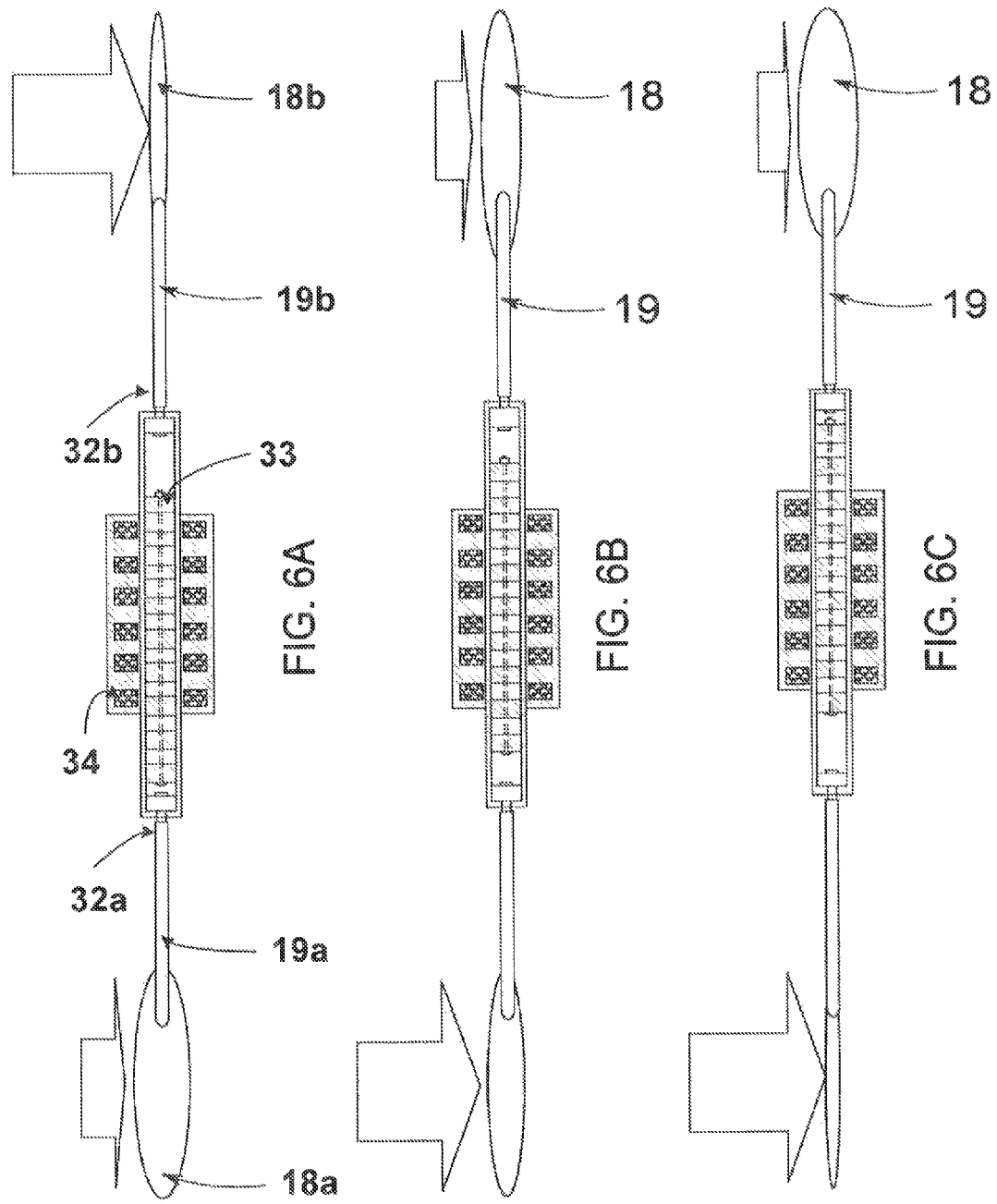

US 8,907,505 B2

METHOD AND APPARATUS FOR GENERATING ELECTRICAL ENERGY

CROSS REFERENCE TO RELATED APPLICATIONS

This application claims priority of U.S. Provisional Application No. 61/574,423, entitled 'Method and Apparatus for Generating Electrical Energy by the Action of Walking or Running', filed on Aug. 3, 2011, which is incorporated by reference herein in its entirety and for all purposes.

FIELD OF THE INVENTION

The present disclosure relates to an apparatus, system and method for obtaining electrical power from the action of the user of the apparatus and in particular from the action of walking or running by the user.

BACKGROUND OF THE INVENTION

Generally, with the increased use of portable electronic equipment and devices such as cell phones, GPS navigation equipment, portable music sources, etc, the need for auxiliary power supply systems is increasing. Available options at present are to charge the battery associated with the portable equipment from a 110/230 volt AC power outlet or to charge the equipment from the 12 volt DC power supply of an automobile. However, such power outlets are not always available when needed.

Previous attempts at generating the needed electrical power from the energy available from the user have been made. These include the use of the user's body temperature to generate electricity by thermo-electric affects, the use of piezo-electric affects to generate electrical power from the users compression and relaxation of a piezo-electric substance as the user walks, dielectric elastomers (electrostrictive polymers) converting mechanical strain to electrical energy, the use of trapped charge to induce a current in an associated conductor and several others. All of these have suffered from defects in their applicability to the generation of useful amounts of power, which will be obvious to one of skill in the art, among these defects being expense, fragility, area of material and volume of apparatus needed to provide useful output power, and complexity.

Therefore, the need remains for a simple, robust and inexpensive method of generating useful amounts of electrical power from the action of walking or running on the part of the user of such means.

This need is addressed in a novel and inventive manner by the disclosed invention.

SUMMARY OF THE INVENTION

The present disclosure presents an exemplary embodiment of an improved, simplified and novel apparatus, system and method for generating useful amounts of electrical power while the user is walking or running which is provided for purposes of illustration and in no way limits the present invention. In embodiments used for examples of the system, the apparatus uses fluid flow generated by bringing a users weight to bear on two or more compressible fluid-filled cavities alternately to generate electricity by using the fluid flow thus generated to move a permanent magnet or magnets past and/or through an electrical coil or coils. This apparatus is embedded within footwear as an integral part of the footwear and generates useful amounts of electrical energy that can be used for the powering of attached or connectable electrical or electronic devices either directly or via a chargeable charge transfer device.

One aspect of the present invention provides an electrical energy generating apparatus comprising:
a fluid containing assembly, comprising:
  a first compressible fluid-filled cavity,
  a second compressible fluid-filled cavity,
  a first connecting and conducting tube connected at its first end to the first compressible fluid-filled cavity allowing fluid flow from and to the first compressible fluid-filled cavity, the first connecting and conducting tube being fluid filled,
  a second connecting and conducting tube connected at its first end to the second compressible fluid-filled cavity allowing fluid flow from and to the second compressible fluid-filled cavity, the second connecting and conducting tube being fluid filled,
  a fluid-filled cylinder,
  a first sealing component, sealing the first end of the cylinder having a hollow connection point connected to the second end of the first connecting and conducting tube allowing the fluid to flow from and to the first connecting and conducting tube, a second sealing component, sealing the second end of the cylinder having a hollow connection point that is connected to the second end of the second connecting and conducting tube that allows fluid to flow from and to the second connecting and conducting tube,
an electrical generation assembly comprising;
  a piston, shaped to conform to the internal cross sectional shape of the cylinder, within the cylinder, free to move in either direction along the cylinder, the piston comprising one or more magnets or one magnet and at least one pole piece;
  one or more electrically conductive insulated wire windings placed within the magnetic field of the piston and wound in alternate clockwise and anti-clockwise directions and connected in series; and
  one or more electrical components electrically connected to the windings,
  wherein, compression of the first compressible fluid-filled cavity or the second compressible fluid-filled cavity causes displacement of the piston causing the magnetic field of the piston to move at substantially right angle past the wire windings causing the magnetic flux within the wire windings to alter thereby generating an electromotive force.

Another aspect of the present invention provides a method of generating electrical energy by an apparatus, the apparatus comprising:
a fluid containing assembly, comprising:
  a first compressible fluid-filled cavity,
  a second compressible fluid-filled cavity,
  a first connecting and conducting tube connected at its first end to the first compressible fluid-filled cavity allowing fluid flow from and to the first compressible fluid-filled cavity, the first connecting and conducting tube being fluid filled,
  a second connecting and conducting tube connected at its first end to the second compressible fluid-filled cavity allowing fluid flow from and to the second compressible fluid-filled cavity, the second connecting and conducting tube being fluid filled,
  a fluid-filled cylinder,
  a first sealing component, sealing the first end of the cylinder having a hollow connection point connected to the second end of the first connecting and conducting tube allowing the fluid to flow from and to the first connecting and conducting tube, a second sealing component, sealing the second end of the cylinder having a hollow connection point that is connected to the second end of the second connecting and conducting tube that allows fluid to flow from and to the second connecting and conducting tube, an electrical generation assembly comprising;

a piston, shaped to conform to the internal cross sectional shape of the cylinder, within the cylinder, free to move in either direction along the cylinder, the piston comprising one or more magnets or one magnet and at least one pole piece;

one or more electrically conductive insulated wire windings placed within the magnetic field of the piston and wound in alternate clockwise and anti-clockwise directions and connected in series; and one or more electrical components electrically connected to the windings, wherein, compression of the first compressible fluid-filled cavity or the second compressible fluid-filled cavity causes displacement of the piston causing the magnetic field of the piston to move at substantially right angle past the wire windings causing the magnetic flux within the wire windings to alter thereby generating an electromotive force.

BRIEF DESCRIPTION OF THE DRAWINGS

The following invention will be described with reference to the following drawings of which:

FIGS. 6A, 6B and 6C show the movement of the of the magnetic piston assembly within the magnetically transparent cylinder and the fluid pressure drive that causes that movement.

FIG. 6A shows how pressure on the right hand bladder has caused the magnetic piston assembly to move to the left, inflating the left hand bladder, FIG. 6B shows pressure on the left hand bladder forcing fluid into the left hand end of the cylinder, causing the magnetic piston assembly to move to the right, past the stator and coils, in which it will induce electromotive force. The right hand bladder is inflating, FIG. 6C shows the left hand bladder fully deflated and that the magnetic piston assembly has moved to the right, fully inflating the right hand bladder.

Figure 1A:
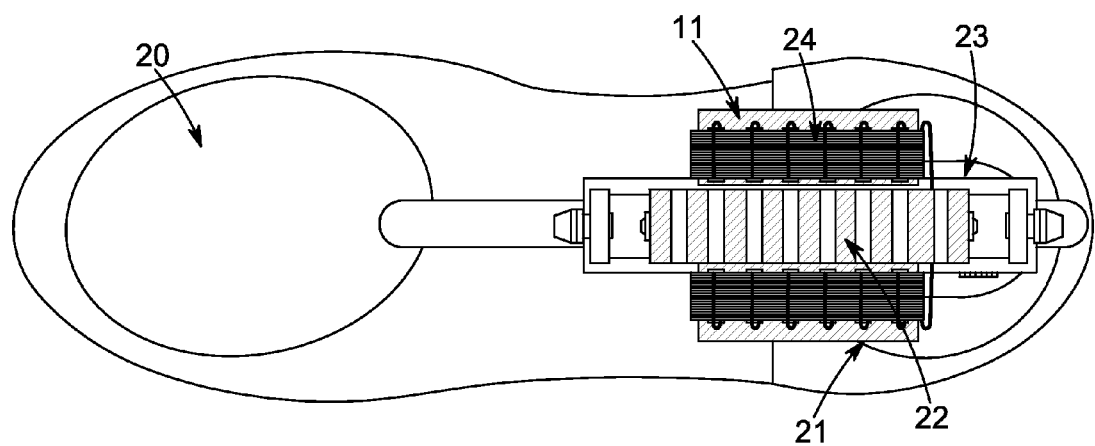
FIG. 1 shows an example of the of the disclosed invention in a boot

Reference Guide to Figures:

| Ref No. | Description |
|---|---|
| 1 | Tube connector connecting tube from bladder to cylinder |
| 2 | Recoil magnet |
| 3 | Light, organic hydraulic fluid |

-continued

Reference Guide to Figures:

| Ref No. | Description |
|---|---|
| 4 | Non ferrous magnet retaining bolt, washer and nut (optional) |
| 5 | Pole piece |
| 6 | Thin walled tube (Cylinder) |
| 7 | Axially magnetized magnet |
| 8 | Magnetically conductive flanges |
| 9 | Clockwise wire windings around aluminum tube and between flux guides |
| 10 | Anti-clockwise wire windings around aluminum tube and between flux guides |
| 11 | "Comb" stator of magnetically conductive material. Extends over aluminum tube |
| 12 | Clockwise wire windings around comb stator teeth |
| 13 | Anti-clockwise wire windings around comb stator teeth |
| 14 | Comb stator tooth |
| 15 | Output wires - opposite polarity during generation of electromotive force |
| 16 | Connection between stators and the windings on each stator |
| 17 | Magnetically conductive sleeve |
| 18 | Fluid filled hydraulic bladder in heel or toe of footwear |
| 19 | Connecting and conducting tube connecting bladder to cylinder |
| 20 | Toe and ball hydraulic cavity |
| 21 | Heel hydraulic cavity |
| 22 | Magnet and pole piece assembly |
| 23 | Rectification, voltage control and power diversion circuitry on PCB |
| 24 | Windings on Ferrite Stator |
| 25 | Power socket and/or battery pouch |
| 26 | Expanded heel hydraulic cavity |
| 27 | Compressed toe and ball hydraulic cavity |
| 28 | Linear generator assembly |

DETAILED DESCRIPTION

The present invention will be described with respect to particular embodiments and with reference to certain drawings but the invention is not limited thereto but only by the claims. The drawings described are only schematic and are non-limiting. In the drawings, the size of some of the elements may be exaggerated or distorted and not drawn on scale for illustrative purposes. Where an indefinite or definite article is used when referring to a singular noun e.g. "a" or "an", "the", this includes a plural of that noun unless something else is specifically stated.

The present disclosure provides an apparatus and method of generating electrical energy in two steps: a hydraulic system that converts the energy from walking into motion of a magnetic piston assembly, consisting of one or more magnets, in the case where more than one magnet is used, the magnets being assembled with like poles facing each other and separated by a magnetically conductive material such as soft iron or ferrite, and an electromagnetic system that harvests the motion of the magnet or magnets using an electrical generation assembly such as a Faraday coil or coils.

FIGS. 1 through 6 illustrate example embodiments of an energy harvesting system, apparatus, and method adapted specifically for translating a walking or running motion into electrical energy.

Although the present invention will be described with reference to the example embodiments illustrated in the figures, it should be understood that many alternative forms can embody the present invention. One of skill in the art will appreciate different ways to alter the parameters of the embodiments disclosed, such as the size, shape, or type of elements or materials, in a manner still in keeping with the spirit and scope of the present invention. In particular, embodiments of the present invention can be used in any application involving the repeated application and release of a force or differential force.

The hydraulic system operates by providing reciprocal fluid flow from the alternate reduction and expansion in volume of two fluid-filled cavities [18] each connected by a connecting and conducting tube [1] to the ends of a magnetically transparent cylinder, this cylinder being sealed at both ends apart from the point where the connecting and conducting tubes are connected to the cylinder [6] in which is present a piston or piston assembly [5,7] that is free to move in either direction in the cylinder as occasioned by the flow of fluid from and to the connected fluid-filled cavities said piston comprising a magnet or magnets [7] whose magnetic field or fields are arranged such that when the magnetic piston or piston assembly is caused to move within the cylinder said magnetic field or fields pass through the windings of a surrounding or closely associated electrically conductive wire coil or coils [9,10] comprising one or more turns of electrically conductive wire wrapped around either the outside of the cylinder containing the magnetic piston or piston assembly and the actuating fluid or held in close proximity to the moving magnet or magnets with the magnetic flux from the magnet or magnets being concentrated in the closely associated coil or coils by magnetically conducting material such as soft iron or ferrite. Other magnetically conducting materials may be used for this purpose. This method and apparatus is illustrated in FIGS. 1 to 6 of this disclosure.

If a single magnet is used to generate the magnetic flux it is magnetized axially, that is, with the north pole of the magnet occupying one face of the piston and the south pole occupying the other. Magnetic flux emanating, conventionally, from the north pole of the magnet passes around the magnet and flows into the south pole. A flux field therefore surrounds the single magnet on all sides and will intercept the surrounding coil or coils as the magnet is driven hydraulically through the cylinder.

As the magnet moves through or past the coil or coils, the flux in any one coil increases and then decreases. Faraday's law states "The induced electromotive force (EMF) in any closed circuit is equal to the time rate of change of the magnetic flux vector through the circuit." For a tightly wound coil of wire, composed of N identical loops, such as that used in the disclosed invention, each with the same $\Phi B$, Faraday's law of induction states that $$\in = -(Nd\Phi)/dt \quad (1)$$

Where $\in$ is the induced electromotive force, measured in volts, N is the number of turns of wire, $\Phi B$ is the magnetic flux in webers through a single loop and t is time. The function $d\Phi/dt$ indicates that the electromotive force is generated when the magnetic flux within the coil changes and that a static flux will not induce an electro motive force within the coil. Thus, as the magnetic piston or magnetic piston assembly moves past the coil or coils, the flux in any one coil changes, rising from effectively zero when the magnetic flux field in question is electromagnetically distant from the coil and rising as the magnet moves past the coil. Maximum flux is reached at the point where the center of the coil coincides with the center of the magnet after which, as the magnet continues to move, the flux decreases.

As the flux field increases an electro motive force will be induced in one direction in the associated coil and as it decreases the electromotive force will be induced in the opposite direction. In this manner, a linear motion, hydraulically driven magnetic piston or magnetic piston assembly is able to induce an alternating current in a surrounding or closely associated conductive wire winding or windings.

Figure 2:
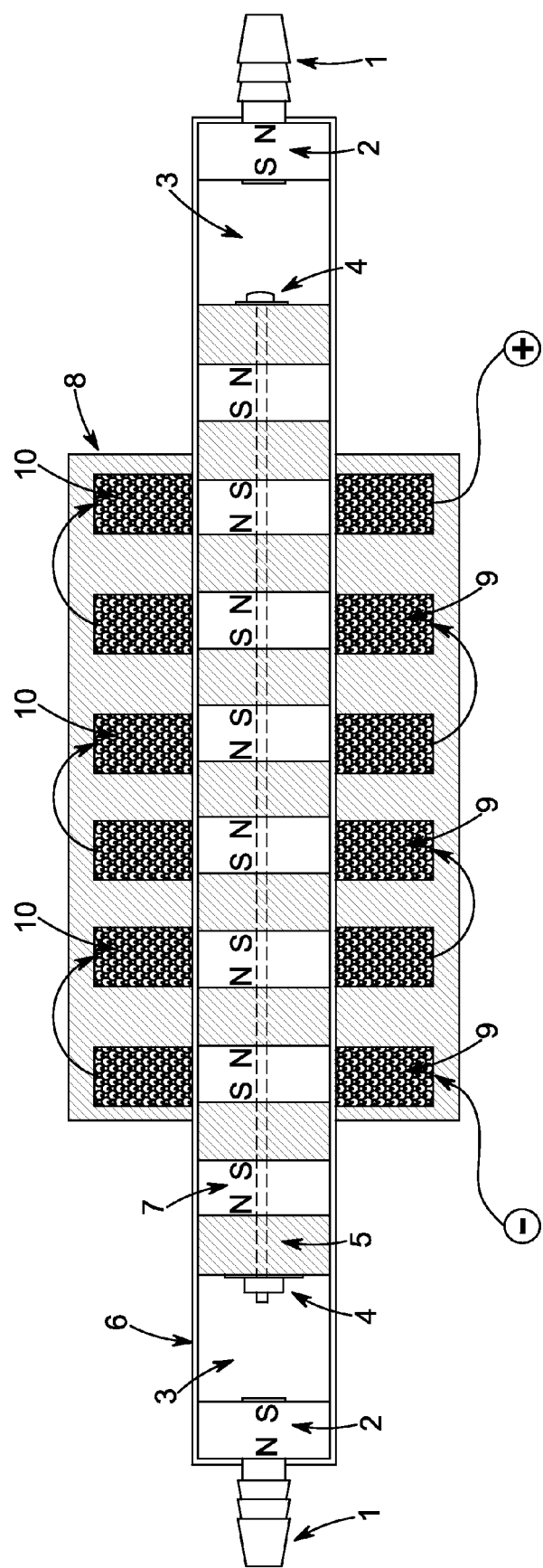
FIG. 2 shows the electricity generating portion of the first preferred embodiment of the disclosed invention.

Two exemplary embodiments of the invention are described here. In the first exemplary embodiment, the wire coil or coils consist of multiple turns of electrically conducting wire wrapped around the outside of the cylinder [9,10] and held in place by flanges [8] of magnetically conducting material placed at or close to the ends of the coil or, in the case where there are more than one wire coil, both at the ends of the series of coils and between and separating the coils. The coils and the flanges are further surrounded by a magnetically conducting sleeve [17] of a length equal to the sum of the lengths of the flanges and coil or coils. The purpose of the magnetically conducting flanges and the surrounding magnetically conducting sleeve is to concentrate the flux from the moving magnetic piston or magnetic piston assembly into the coil or coils. This embodiment, with multiple coils. is shown in FIG. 2 of this disclosure. The flanges and sleeve may also be produced as a single unit or as multiple units that, when assembled, constitute a unit of equivalent geometry to the flanges and sleeve.

In a magnetic piston assembly consisting of a series of magnets assembled with similar poles facing each other and separated by magnetically conductive material separators, the pole pieces [5], the flux fields will be guided by the separators to the circumference of the pole pieces where they will appear as alternatively north and south fields emanating from the circumference of the pole pieces. Flux flow will be between these annular magnetic poles, conventionally form north to south.

As the magnetic piston assembly moves past the surrounding wire coil or coils, a series of increasing and decreasing flux fields will impinge on the coils, inducing an electromotive force in each coil. In the first exemplary embodiment of the invention, (FIG. 2) the coils are wound in alternate clockwise and anti-clockwise directions and connected in series. Thus, with the correct spacing between coils, magnets, flanges and pole pieces, one coil is subjected to an increasing and then decreasing north flux field while its neighbor coil will be subjected to an increasing and then decreasing south flux field and, if the coils are connected in series the induced electro motive force in one coil will, electrically, be in the same direction as its neighbor coil and the overall induced electromotive force will be the sum of the electromotive forces in all series connected coils. This exemplary embodiment is illustrated in FIG. 2.

Figure 3:
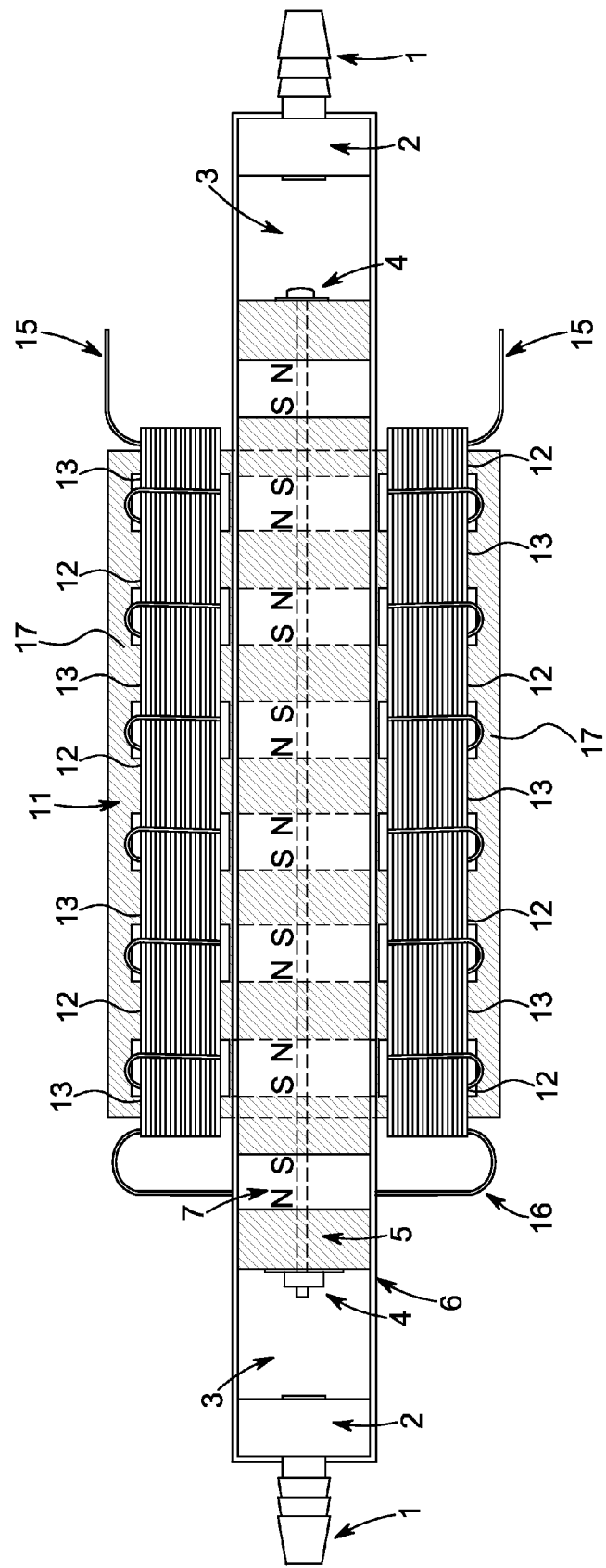
FIG. 3 shows the electricity generating portion of the second preferred embodiment of the disclosed invention.
Figure 4:
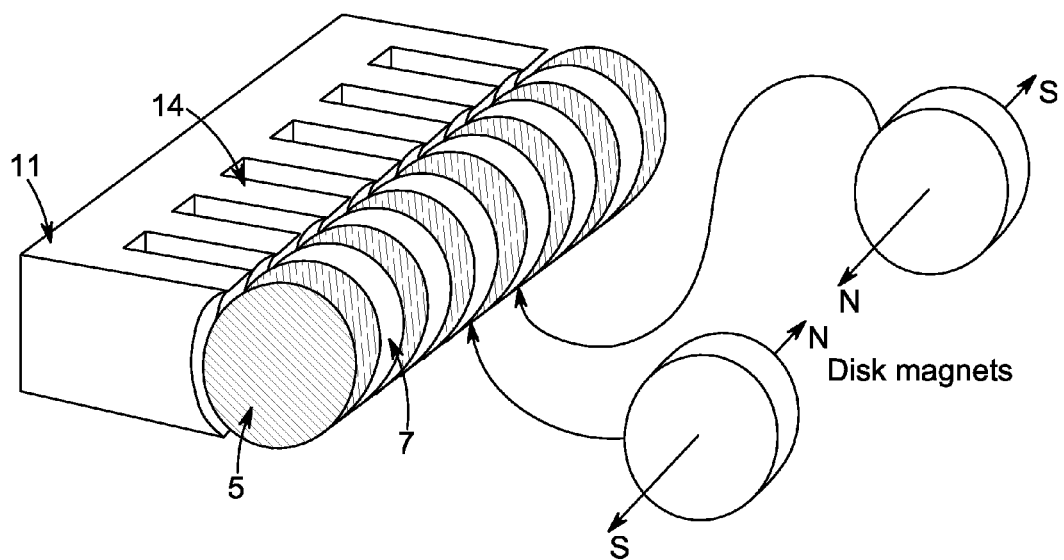
FIG. 4 shows the relationship between a magnetic piston assembly and a comb stator in the second preferred embodiment of the invention and the orientation of the axially magnetized magnets that are components of the piston assembly.

In the second exemplary embodiment (FIG. 3) the coil or coils are held in close proximity to the cylinder in which the magnetic piston or piston assembly is caused to move by hydraulic pressure. Since the space within a boot or shoe into which to fit the disclosed invention is limited, this embodiment is designed with this restriction in mind. This embodiment is shown in FIGS. 3, 4 and 5.

Referring to these diagrams, the cylinder, as in the first exemplary embodiment, contains a magnetic piston assembly consisting of axially magnetized magnets and magnetically conductive pole pieces, with similar magnet poles facing each other through the pole pieces creating a series of annular magnetic fields emanating from the circumference of the pole pieces. In FIGS. 4 and 5 it can be seen that associated with the cylinder in which the magnetic piston assembly moves and positioned on diametrically opposite sides of the cylinder are two stator assemblies consisting of a "comb" [11] of magnetically conductive material, the teeth of which [14], when viewed from a front elevation, will form a rectangle whose height exceeds its width. Around the teeth are wrapped a series of wire coils. These coils are wrapped in opposite directions around each adjacent tooth and are connected in series.

Figure 5:
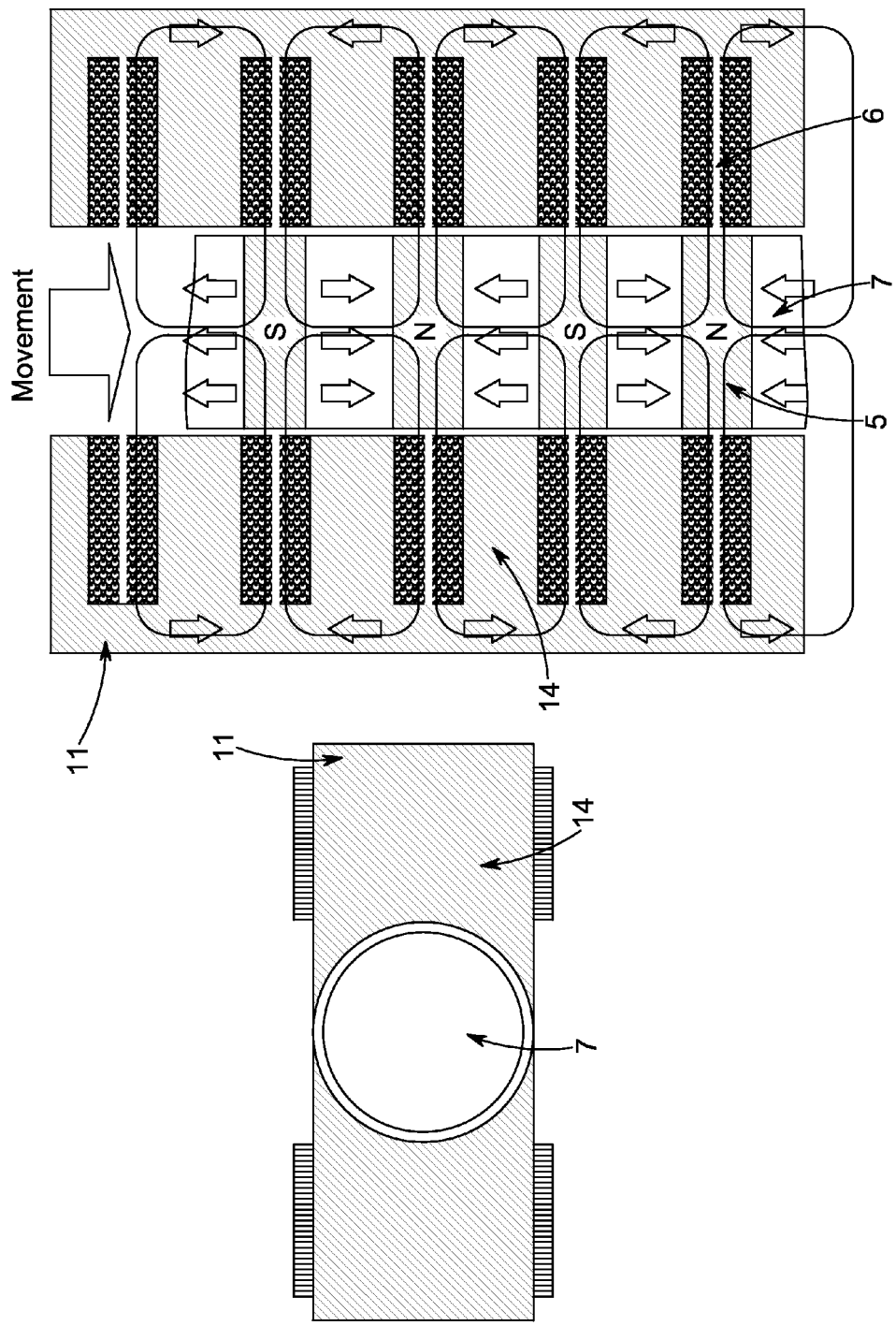
FIG. 5 shows the magnetic architecture of the second preferred embodiment.

As can be seen in FIG. 5, the teeth of the magnetically conducting comb, when viewed in cross section, almost completely surround the cylinder. Flux emanating from the circumference of the pole pieces in the magnetic piston assembly will be conducted by the magnetically conducting comb teeth into the stator and concentrated into the coils around the comb teeth. This occurs equally within each of the two stators.

Therefore, as the magnetic piston assembly moves past the stators, flux from the pole pieces is conducted by the comb teeth to the coils and, as the flux density rises and falls within the coils, an electromotive force is generated within the coils, according to Faraday's law.

Further, the present disclosure provides for an electricity generating device in which fluid-filled cavities [18], which can be shaped to prevent discomfort to the user and held within the sole and/or heel portion of the user's footwear are alternately compressed and expanded by the shifting of the user's weight during the act of walking or running. The fluid in those cavities upon which the user's weight is imposed is, by the pressure exerted upon it, caused to flow into a connecting and conducting tube [1] and from that tube to a sealed cylinder shaped in cross section to accept a strongly magnetized piston or piston assembly as described above. This magnetic piston or piston assembly is caused to move within the cylinder by the flow of the fluid into the cylinder. The end of the cylinder into which the magnetic piston is caused to move is in all respects identical to the end of the cylinder into which the fluid is caused to flow and is also fluid-filled. The movement of the piston within the cylinder forces the fluid in the further end of the cylinder out of the cylinder into a connecting and conducting tube which is, in turn, connected to another fluid-filled cavity within the user's footwear. The geometry of the cylinder may be linear or curved provided that the magnetic piston or magnetic piston assembly is conforms to the shape of the cylinder and that its free movement in not constricted by the shape of the cylinder.

The two fluid-filled cavities are, in one example of the apparatus, positioned in the user's footwear under the heel (the heel cavity) and under the ball of the foot of the user (the sole cavity) such that the action of walking or running in a normal manner alternately places the user's weight on the heel cavity of the footwear or insert and on the sole cavity of the footwear or insert.

Figure 1B:
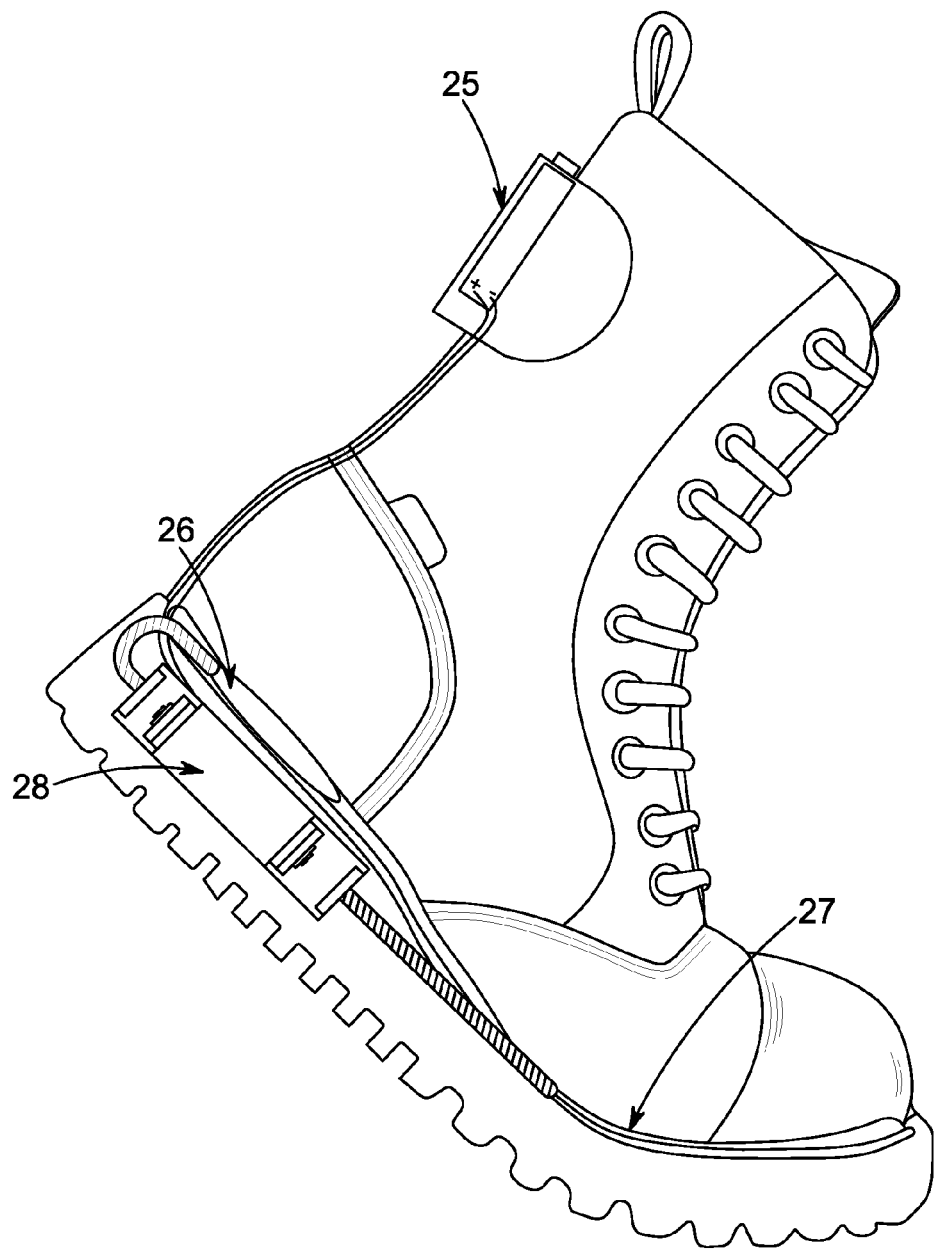

Since the heel cavity and the sole cavity are alternately compressed and allowed to expand by the action of walking, the induced movement of the fluid in these cavities drives the magnetized piston or magnetic piston assembly alternately in each direction within the cylinder. The heel and sole cavities are of identical volumes. An example installation of this apparatus mounted within a boot is shown in FIG. 1.

It will be evident to one skilled in the art that many other embodiments are possible.

Thus an apparatus as previously described and illustrated in FIGS. 1 to 6 produces a moving magnetic field driven with considerable force by the action of the user in alternately compressing the fluid-filled cavities in the footwear and allowing them to expand by the shifting of the user's weight during the act of walking or running. Since the user's weight will vary markedly, from the weight of a small child to that of a large adult, it is not possible to predict the force exerted or the subsequent energy that can be generated.

Prior calculations of the energy expended by a person weighting 60 Kg in walking have provided a value of 67 watts. This value will obviously vary according to the weight of the walker. The novel use of hydraulics here disclosed can efficiently transfer a useful portion of this energy to the electromagnetic system and from there to any connected electrical equipment.

When an electrical current is induced in the coil or coils by the movement of the magnetic field or fields associated with the magnetic piston or piston assembly, this current in turn generates a magnetic field that will be in opposition to that of the magnetic piston or piston assembly.

With reference to equation (1), it will be seen that the right hand term of the equation is preceded by a negative sign, indicating that the induced current is in opposition to the originating magnetic flux. In practice, this is seen as a magnetic flux field generated by current flow within the wire coils which will oppose the magnetic flux field produced by the originating magnet or magnets.

This opposing magnetic field will oppose the movement of the magnetic piston or piston assembly and reduce its speed through or past the coil or coils. By adjusting the number of turns of electrically conducting wire on the coil or coils and the electrical load on the apparatus, this opposing magnetic field can be adjusted to allow the magnetic piston or piston assembly to travel from one end of the cylinder to the other during one heel or toe compression of the hydraulic bladders. If this condition is met, maximum electrical energy will be extracted from the apparatus. Since the movement of the magnetic piston is slowed, it follows that the flow of fluid from the fluid-filled cavity under pressure from the user's weight is also slowed, cushioning the user's footfall and increasing the user's comfort.

The electrical current produced by the apparatus will be directly proportional to:
The number of turns of electrically conducting wire on the coil or coils, the strength of the magnetic field produced by the magnetized piston or piston assembly, the shape and concentration of the magnetic flux field, the speed at which the magnetized piston or piston assembly is caused to move by the fluid pressure placed longitudinally upon it,
and inversely proportional to:
the impedance of the electrical load placed on the output of the coil or coils, the resistance to electrical current flow of the wire making up the coil or coils.

By changing these variables the power generated by the apparatus may be changed. By optimizing these variables, it is possible to ensure that maximum power is extracted from the system during each heel or toe bladder compression by the user.

The electrical output of the apparatus will be in the form of an alternating current, with current flowing in one direction as the magnetic flux within the coil or coils increases and in the other as the magnetic flux within the coil or coils decreases.

In some embodiments of the invention the electrical output from the coil may be connected to a bridge rectifier, used to provide an electrical output of a single polarity as may be required by some electrical loads placed upon the apparatus.

However, should the electrical output from coil be required to perform useful work for which an electrical current of either polarity is sufficient and for which energy storage is not required, the bridge rectifier may be eliminated. Such work may be, for example, the warming of the soles of footwear using a resistance wire embedded in the soles of that footwear for use in winter, arctic or mountainous environments. The temperature of this resistance wire and subsequently the temperature felt by the user of the footwear in which this embodiment of the invention is installed may be controlled by a positive response thermistor or other control apparatus embedded in the sole of the boot in such a manner that, as the temperature of the sole of the boot increases, the resistance or impedance of the thermistor or other control apparatus increases proportionately and the current into the said resistance wire is reduced, decreasing the heat produced by the resistance wire. In this manner, the temperature of the sole of the boot may be controlled to within close tolerance. It will be evident to one skilled in the art that other methods of temperature control are both possible and practicable.

This embodiment of the invention may be applied to any part of the clothing worn by the user of the invention. An electrical connection from the electrical output of the invention to the clothing into which resistance wire is inserted, for example, a pair of gloves, is all the additional equipment required.

In embodiments of the invention where the storage of generated electrical power is required, the output of the bridge rectifier, of a single polarity, is connected to power storage and voltage control circuitry. The incoming DC power at varying voltages and currents (depending on the momentary velocity and position of the magnetic piston within the cylinder) is stored in a chemical battery and/or in an ultracapacitor or other storage device, the action of the bridge rectifier preventing reverse current flow from such power storage. The voltage control circuitry, by electronic means, converts this stored power into a constant low output impedance DC voltage source or sources from which power may be obtained at current rates and voltage levels that are determined by the power requirements of the connected electrical or electronic equipment.

The fluid used in the operation of this apparatus may consist of either a gas, which will normally be air, or a liquid. Light organic hydraulic oil is best suited to this purpose, however this does not preclude the use of any low viscosity fluid. However liquids are preferred due to their low compressibility. One of skill in the art will appreciate that any suitable fluid can be utilized.

In another embodiment of the invention, the output of the coil is connected via electrically conducting wires to a bridge rectifier, electrical storage device and/or DC to DC voltage converters worn elsewhere on the body of the user, for example in a military webbing belt or equipment vest and the electrical output of the said voltage converters used to provide electrical power for any one or combination of the following:

Personal communication radio ("walkie talkie"), Night vision goggles, Powered telescopic rifle sights, Global positioning satellite receiving equipment, Flashlights, Personal computers and/or calculators, Laser designators, Personal music players, Video recorders, Cameras, Health monitoring equipment, Battery chargers, other portable equipment not listed here.

In this embodiment the output from two separate electrical power generating apparati may be used, that is, the electrical output from a generator installed in each piece of a pair of footwear, and the combined electrical outputs, after rectification, stored in the electrical storage device worn elsewhere on the user's body.

In yet other embodiments, electricity generated from the reciprocating motion of the magnetic piston within the coils can be used to power or charge operationally detachable and reattachable electronic devices, equipment, or components. An example of such a detachable device is a chargeable device that is electrically connected to the output of the coil by a plug and socket and which is attached to the footwear in which the generator is situated. Such attachment may be via a plug and socket or slide connector and such attachment and/or separate attachment further holds the attached chargeable unit firmly to the footwear. The chargeable unit may comprise a housing, a plug or socket, a strap or other attachment to hold the unit firmly to the footwear, a rechargeable battery or ultracapacitor or combination of batteries and ultracapacitors and a circuit that converts the stored electrical power to a form that can be used to recharge the battery on another piece of electrical or electronic equipment. An example of the use to which such a charge carrying unit may be put is to store sufficient electrical power to recharge an I-pod or other unit of personal electronics in which the integral rechargeable battery cannot easily be removed from the casing of the unit of personal electronics. In this example use, the chargeable unit stores electrical energy generated by the coil and reciprocating magnet until such time as the user's I-pod or other unit of personal electronics requires a battery recharge. At that time, the chargeable unit is detached from the user's footwear and the stored charge is transferred to the I-pod or other unit of personal electronics either by plugging the chargeable unit directly into the I-pod or other unit of personal electronics or by electrically attaching it using a connecting electrically conducting cord specific to the type of personal electronic equipment involved. The electronics in the rechargeable unit ensures that all the charge stored in the rechargeable unit is transferred to the I-pod or other unit of personal electronics.

In another embodiment of the invention, the fluid-filled cavities in the heels and/or soles of the user's footwear are connected via fluid-filled tubes to a cylinder mounted on an equipment belt, vest or by some other method held close to the user's body such that the alternate compression and expansion of the fluid-filled cavities drives the fluid through the connecting tubes and causes a magnetic piston or magnetic piston assembly to move within the cylinder and the associated electrical coil or coils, the rectification and voltage control circuitry being held within the same belt, vest or other method of holding the apparatus close to the user's body. In this embodiment, the action of the user in placing his or her weight alternately on each heel or heel and toe will provide the pressure that will cause the magnetic piston to move within the cylinder and through the surrounding coil in a reciprocating motion, thereby generating an electrical output.

A further embodiment of the invention uses the power generated by the action of walking and the operation of the invention to charge a battery or ultracapacitor and to use the power thus stored to direct a current through a bright white light emitting diode mounted in a small parabolic reflector itself mounted in the toe of the footwear in which the apparatus is installed, thereby providing illumination for the user when required. Additionally, such stored electrical power may be used to illuminate red or other colored light emitting diodes mounted in the user's footwear thereby alerting automobile drivers and/or others of the presence of the user in the absence of other illumination. Such colored light emitting diodes can also be caused to flash on and off, thereby increasing their ability to warn others of the user's presence.

Referring to FIGS. 1 and 6, an embodiment of the present invention provides an electrical energy generating apparatus comprising:
  a fluid containing assembly, comprising:
  a first compressible fluid-filled cavity 18*a*,
  a second compressible fluid-filled cavity 18*b*,
  a first connecting and conducting tube 19*a* connected at its first end to the first compressible fluid-filled cavity 18*a* allowing fluid flow from and to the first compressible fluid-filled cavity 18*a*, the first connecting and conducting tube 19*a* being fluid filled,
  a second connecting and conducting tube 19*b* connected at its first end to the second compressible fluid-filled cavity 18b allowing fluid flow from and to the second compressible fluid-filled cavity 18b, the second connecting and conducting tube 19b being fluid filled, a fluid-filled cylinder 31, a first sealing component 32a, sealing the first end of the cylinder 31 having a hollow connection point connected to the second end of the first connecting and conducting tube 19a allowing the fluid to flow from and to the first connecting and conducting tube 19a, second sealing component 32b, sealing the second end of the cylinder 31 having a hollow connection point that is connected to the second end of the second connecting and conducting tube 19b that allows fluid to flow from and to the second connecting and conducting tube 19b, an electrical generation assembly comprising;

a piston 33, shaped to conform to the internal cross sectional shape of the cylinder 31, within the cylinder 31, free to move in either direction. along the cylinder 31, the piston comprising one or more magnets or one magnet and at least one pole piece;

one or more electrically conductive insulated wire windings 34 placed within the magnetic field of the piston and wound in alternate clockwise and anti-clockwise directions and connected in series; and one or more electrical components 25 electrically connected to the windings.

An embodiment of the present invention provides an electrical energy generating apparatus, wherein at least one of the magnets is axially magnetized.

An embodiment of the present invention provides an electrical energy generating apparatus, wherein, compression of the first compressible fluid-filled cavity or the second compressible fluid-filled cavity causes displacement of the piston causing the magnetic field of the piston to move at substantially right angle past the wire windings causing the magnetic flux within the wire windings to alter thereby generating an electromotive force.

An embodiment of the present invention provides an electrical energy generating apparatus, wherein action of user causes the fluid-filled cavity to alternately compress and expand thereby causing a reciprocal flow of fluid into opposite ends of the cylinder causing the piston to move in a reciprocal motion further exciting an electrical current in the wire windings.

Another embodiment of the present invention provides an electrical energy generating apparatus, wherein pressure induced in the first cavity by action of a user of placing pressure on the first fluid-filled cavity causes the fluid from the first fluid-filled cavity to flow via the connecting fluid connecting and conducting tube into the enclosed cylinder causing a magnetized piston or magnetic piston assembly to move in the cylinder and in turn causing the fluid enclosed in the cylinder on the other side of the piston from the side into which the fluid is being forced by the user's weight to flow out of the cylinder via the other connecting and connecting tube and to inflate the fluid-filled cavity upon which the user's pressure in not currently being placed.

Another embodiment of the present invention provides an electrical energy generating apparatus, wherein the wire windings comprise a multiple turn winding of insulated conducting wire around the outer circumference of the cylinder or magnetically associated with the cylinder in which the moving magnetic field of the piston induce an electrical current.

Another embodiment of the present invention provides an electrical energy generating apparatus, wherein amplitude of the output current is directly proportional to variables such as the total number of turns of electrically conducting wire, the strength of the magnetic field or fields produced by the magnetized piston or piston assembly and the velocity at which the magnetized piston is caused to move by the fluid pressure placed longitudinally upon it.

Another embodiment of the present invention provides an electrical energy generating apparatus, wherein the output current is inversely proportional to variables such as the impedance of the electrical load placed on the output of the coil and, the resistance to electrical current flow of the wire making up the coil around the cylinder.

Another embodiment of the present invention provides an electrical energy generating apparatus, wherein movement of the piston causes a flow of electric current in surrounding or magnetically associated conducting wire windings.

Another embodiment of the present invention provides an electrical energy generating apparatus, wherein output current of the wire windings comprise alternating current.

Another embodiment of the present invention provides an electrical energy generating apparatus, wherein frequency of the output current is governed at least in part by the rate at which the user of the apparatus takes steps while walking or running and by the number of magnetic flux fields produced by the magnetic piston or magnetic piston assembly and by the number of electrically conducting wire coils magnetically associated to the magnetic piston or magnetic piston assembly.

A yet another embodiment of the present invention provides an electrical energy generating apparatus, wherein the output current is used to electrically charge one or more ultra-capacitors connected in series and/or parallel; or one or more batteries connected in series and/or parallel; or a combination of batteries and ultra capacitors connected in series or parallel or both in series and parallel.

Another embodiment of the present invention provides an electrical energy generating apparatus, wherein, the apparatus further comprises a battery and/or ultra-capacitor, wherein the electrical output of the wire windings charges a battery and/or ultra-capacitor and the charge on the battery and/or ultra capacitor is in turn used to power an electrical or electronic device that the user of the apparatus may in addition be wearing being such additional apparatus as night vision goggles, radio transmitters and receivers, GPS location equipment or a means of illumination however such powered apparatus is not limited to that described herein.

Another embodiment of the present invention provides an electrical energy generating apparatus, wherein, the apparatus further comprises a bridge rectifier component coupled to the wire windings for rectifying the output of the wire windings from alternating current to direct current.

An embodiment of the present invention provides an electrical energy generating apparatus, wherein, the apparatus further comprises an electronic circuitry for controlling of the output of the bridge rectifier so as to prevent exceeding a maximum voltage or power level.

An embodiment of the present invention provides an electrical energy generating apparatus, wherein the apparatus is mounted on an object for attaching the apparatus close to the body of the user.

An embodiment of the present invention provides an electrical energy generating apparatus, wherein the apparatus generates current which is used to heat a resistance wire held in the interior lining of the object associated with the apparatus, temperature of the resistance wire being controlled by a thermistor or other means whose resistance or impedance is directly proportional to the temperature of the lining of the object, the resistance wire being used to warm the interior of the object and to maintain the interior of the object at a temperature suitable for human body.

An embodiment of the present invention provides an electrical energy generating apparatus, wherein the object for attaching the apparatus close to the body of the user is a footwear, a body suit, belt, vest, personal communication devices, radio, walkie-talkie, Night vision goggles, sun glasses, Powered telescopic rifle sights, Global positioning satellite receiving equipment, Flashlights, Personal computers and/or calculators, Laser designators, Personal music players, Video recorders, Cameras, Health monitoring equipment, Battery chargers, other portable equipment not listed here.

An embodiment of the present invention provides an electrical energy generating apparatus, wherein, the apparatus further comprises an electronic circuitry for controlling of the output of the bridge rectifier so as to prevent exceeding a maximum voltage or power level.

An embodiment of the present invention provides an electrical energy generating apparatus, wherein the apparatus is mounted on an object for attaching the apparatus close to the body of the user.

An embodiment of the present invention provides an electrical energy generating apparatus, wherein the apparatus generates current which is used to heat a resistance wire held in the interior lining of the object associated with the apparatus, temperature of the resistance wire being controlled by a thermistor, a temperature controlled impedance or a resistance controlling device.

An embodiment of the present invention provides an electrical energy generating apparatus, wherein the object is a footwear, a body suit, belt, vest, personal communication devices, radio, walkie-talkie, Night vision goggles, sun glasses, Powered telescopic rifle sights, Global positioning satellite receiving equipment, Flashlights, Personal computers and/or calculators, Laser designators, Personal music players, Video recorders, Cameras, Health monitoring equipment, Battery chargers, a portable equipment.

An embodiment of the present invention provides a method of generating electrical energy by an apparatus, the apparatus comprising:
  a fluid containing assembly, comprising:
  a first compressible fluid-filled cavity,
  a second compressible fluid-filled cavity,
  a first connecting and conducting tube connected at its first end to the first compressible fluid-filled cavity allowing fluid flow from and to the first compressible fluid-filled cavity, the first connecting and conducting tube being fluid filled,
  a second connecting and conducting tube connected at its first end to the second compressible fluid-filled cavity allowing fluid flow from and to the second compressible fluid-filled cavity, the second connecting and conducting tube being fluid filled,
  a fluid-filled cylinder,
  a first sealing component, sealing the first end of the cylinder having a hollow connection point connected to the second end of the first connecting and conducting tube allowing the fluid to flow from and to the first connecting and conducting tube, a second sealing component, sealing the second end of the cylinder having a hollow connection point that is connected to the second end of the second connecting and conducting tube that allows fluid to flow from and to the second connecting and conducting tube,
  an electrical generation assembly comprising;
  a piston, shaped to conform to the internal cross sectional shape of the cylinder, within the cylinder, free to move in either direction along the cylinder, the piston comprising one or more magnets or one magnet and at least one pole piece;
  one or more electrically conductive insulated wire windings placed within the magnetic field of the piston and wound in alternate clockwise and anti-clockwise directions and connected in series; and
  one or more electrical components electrically connected to the windings.

An embodiment of the present invention provides a method of generating electrical energy by an apparatus, the apparatus comprising:
  a fluid containing assembly, comprising:
  a first compressible fluid-filled cavity,
  a second compressible fluid-filled cavity,
  a first connecting and conducting tube connected at its first end to the first compressible fluid-filled cavity allowing fluid flow from and, to the first compressible fluid-filled cavity, the first connecting and conducting tube being fluid filled,
  a second connecting and conducting tube connected at its first end to the second compressible fluid-filled cavity allowing fluid flow from and to the second compressible fluid-filled cavity, the second connecting and conducting tube being fluid filled,
  a fluid-filled cylinder,
  a first sealing component, sealing the first end of the cylinder having a hollow connection point connected to the second end of the first connecting and conducting tube allowing the fluid to flow from and to the first connecting and conducting tube, a second sealing component, sealing the second end of the cylinder having a hollow connection point that is connected to the second end of the second connecting and conducting tube that allows fluid to flow from and to the second connecting and conducting tube,
  an electrical generation assembly comprising;
  a piston, shaped to conform to the internal cross sectional shape of the cylinder, within the cylinder, free to move in either direction along the cylinder, the piston comprising one or more magnets or one magnet and at least one pole piece;
  one or more electrically conductive insulated wire windings placed within the magnetic field of the piston and wound in alternate clockwise and anti-clockwise directions and connected in series; and
  one or more electrical components electrically connected to the windings;
  wherein, compression of the first compressible fluid-filled cavity or the second compressible fluid-filled cavity causes displacement of the piston causing the magnetic field of the piston to move at substantially right angle past the wire windings causing the magnetic flux within the wire windings to alter thereby generating an electromotive force.

Another embodiment of the present invention provides a method of generating electrical energy, wherein compression of the first compressible fluid-filled cavity or the second compressible fluid-filled cavity causes displacement of the piston causing the magnetic field of the piston to move at substantially right angle past the wire windings causing the magnetic flux within the wire windings to alter thereby generating an electromotive force.

Another embodiment of the present invention provides a method of generating electrical energy, wherein action of user causes the fluid-filled cavity to alternately compress and expand thereby causing a reciprocal flow of fluid into opposite ends of the cylinder causing the piston to move in a reciprocal motion further exciting an electrical current in the wire windings.

Another embodiment of the present invention provides a method of generating electrical energy, the method comprising a hydraulic system and an electromagnetic system, wherein the hydraulic system converts energy generated by action of a subject into motion of a magnetic piston; and the electromagnetic system harvests motion of the magnetic piston across electrically conductive insulated wire windings placed within magnetic field of the piston and are connected in series and wound alternately in clockwise and anti-clockwise directions.

Another embodiment of the present invention provides a method of generating electrical energy, wherein the magnetic piston movement across the surrounding wire windings causes a series of altering flux field to impinge on the windings thereby inducing an electromotive force in each winding.

Another embodiment of the present invention provides a method of generating electrical energy, wherein as the flux field increases an electro motive force is induced in one direction in the wire windings and as it decreases the electromotive force is induced in the opposite direction which causes the magnetic piston to induce an alternating current in the wire windings.

Another embodiment of the present invention provides a method of generating electrical energy, wherein pressure induced in the first cavity by action of a user of placing pressure on the first fluid-filled cavity causes the fluid from the first fluid-filled cavity to flow via the connecting fluid connecting and conducting tube into the enclosed cylinder causing a magnetized piston or magnetic piston assembly to move in the cylinder and in turn causing the fluid enclosed in the cylinder on the other side of the piston from the side into which the fluid is being forced by the user's weight to flow out of the cylinder via the other connecting and connecting tube and to inflate the fluid-filled cavity upon which the user's pressure in not currently being placed.

An embodiment of the present invention provides an electrical energy generating apparatus, wherein the alternating electrical current from the coil or coils in each of the users items of footwear is connected to a further apparatus worn elsewhere on or close to the users body in which electrical rectification, voltage control, power storage and output voltage control is undertaken and from which electrical power at varying voltages and current availabilities may be withdrawn for use by other equipment carried or worn by the user or carrier of the said apparatus.

An embodiment of the present invention provides an electrical energy generating apparatus, wherein the compressible cavities are held in the heels of the user's footwear and the cylinder and associated components are held on a belt worn by the user or in a vest worn by the user or in another manner held close to the user's body and the compressible fluid-filled cavities are connected to the cylinder as described above by connecting and conducting tubes extending along the person of the user to connectors on the end caps of the cylinder the magnetic piston or magnetic piston assembly, electricity generating coil or coils and other components being otherwise arranged substantially as described.

An embodiment of the present invention provides an electrical energy generating apparatus, wherein the fluid-filled cavities are held in the heels and/or soles of the footwear to which the apparatus is connected such cavities being connected via fluid-filled tubes to an apparatus as described above, mounted on a belt or other means of attaching the apparatus close to the body of the user in which the action of the user taking steps that place his or her weight alternately on the heels and/or the ball of his or her feet-causing each fluid-filled cavities to drive fluid into the connecting tube or tubes and subsequently into the cylinder of the apparatus thereby driving the magnetic piston or magnetic piston assembly alternately in each direction in turn as previously described and causing the fluid to flow into the fluid-filled cavity upon which the users weight is not directed by the action of walking thus maintaining reciprocal action of the magnetized piston or piston assembly through the electrical coil or coils or past the magnetically closely associated coil or coils.

An embodiment of the present invention provides an electrical energy generating apparatus, wherein the fluid-filled cavities are enclosed in the heel and sole of a boot or shoe or other footwear with the fluid-filled cavity within the heel of the footwear being connected by a fluid connecting and conducting tube to one end of the cylinder and the fluid-filled cavity under within the sole of the footwear being connected by a fluid connecting and conducting tube to the other the other end of the said cylinder.

An embodiment of the present invention provides an electrical energy generating apparatus, wherein, the apparatus further comprises a battery and/or ultra-capacitor, wherein the electrical output of the wire windings charges a battery and/or ultra-capacitor and the charge on the battery and/or ultra capacitor is in turn used to power an electrical or electronic device that the user of the apparatus may in addition be wearing being such additional apparatus as night vision goggles, radio transmitters and receivers, GPS location equipment or a means of illumination however such powered apparatus is not limited to that described herein.

An embodiment of the present invention provides an electrical energy generating apparatus, wherein the fluid-filled cavities are held in the heels and/or soles of the footwear to which the apparatus is connected such cavities being connected via fluid-filled tubes to an apparatus as described above, mounted on a belt or other means of attaching the apparatus close to the body of the user in which the action of the user taking steps that place his or her weight alternately on the heels and/or the ball of his or her feet causing each fluid-filled cavities to drive fluid into the connecting tube or tubes and subsequently into the cylinder of the apparatus thereby driving the magnetic piston or magnetic piston assembly alternately in each direction in turn as previously described and causing the fluid to flow into the fluid-filled cavity upon which the users weight is not directed by the action of walking thus maintaining reciprocal action of the magnetized piston or piston assembly through the electrical coil or coils or past the magnetically closely associated coil or coils.

An embodiment of the present invention provides an electrical energy generating apparatus, wherein the electrical coil or coils comprise a multiple turn winding of insulated conducting wire around the outer circumference of the cylinder or magnetically closely associated with the cylinder in which the moving magnetic field or fields of the magnetized piston induce an electrical current the ends of the wire being the points at which the induced electrical current may be connected to the immediate load of the coil or coils this immediate load consisting of either the parts of the apparatus that determine the uses to which the induced electrical current shall be put or another load for which said purpose determining apparatus is not required.

One of skill in the art will appreciate that the embodiments provided above are exemplary and in no way limit the present invention.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The Abstract of the disclosure will allow the reader to quickly ascertain the nature of the technical disclosure. It is submitted with the understanding that it will not be used to interpret or limit the scope or meaning of the following claims.

What is claimed is:

1. An electrical energy generating apparatus in combination with a footwear, the apparatus comprising:
    a liquid containing assembly comprising:
        a first compressible liquid-filled cavity,
        a second compressible liquid-filled cavity,
        a first connecting and conducting tube connected at its first end to the first compressible liquid-filled cavity allowing liquid flow from and to the first compressible liquid-filled cavity, the first connecting and conducting tube being liquid filled,
        a second connecting and conducting tube connected at its first end to the second compressible liquid-filled cavity allowing liquid flow from and to the second compressible liquid-filled cavity, the second connecting and conducting tube being liquid filled,
        a liquid-filled cylinder,
        a first sealing component, sealing the first end of the cylinder having a hollow connection point connected to the second end of the first connecting and conducting tube allowing the liquid to flow from and to the first connecting and conducting tube,
        a second sealing component, sealing the second end of the cylinder having a hollow connection point that is connected to the second end of the second connecting and conducting tube that allows liquid to flow from and to the second connecting and conducting tube,
    an electrical generation assembly comprising:
        a wearable piston disposed in a sole of the footwear, and shaped to conform to the internal cross sectional shape of the cylinder, within the cylinder, free to move in a longitudinal direction along the cylinder, the piston comprising a plurality of magnets with similar poles facing each other and separated by one or more pole pieces, the magnets being axially magnetized along the longitudinal direction;
        one or more electrically conductive insulated wire windings placed within the magnetic field of the piston and wound in alternate clockwise and anticlockwise directions and connected in series; and
        one or more electrical components electrically connected to the windings.

2. The apparatus of claim 1, wherein compression of the first compressible liquid-filled cavity or the second compressible liquid-filled cavity causes displacement of the piston causing the magnetic field of the piston to move at substantially right angle past the wire windings causing the magnetic flux within the wire windings to alter thereby generating an electromotive force.

3. The apparatus of claim 1, wherein action of user causes the liquid-filled cavity to alternately compress and expand thereby causing a reciprocal flow of liquid into opposite ends of the cylinder causing the piston to move in a reciprocal motion further exciting an electrical current in the wire windings.

4. The apparatus of claim 1, wherein pressure induced in the first cavity by action of a user of placing pressure on the first liquid-filled cavity causes the liquid from the first liquid-filled cavity to flow via the connecting liquid connecting and conducting tube into the enclosed cylinder causing a magnetized piston or magnetic piston assembly to move in the cylinder and in turn causing the liquid enclosed in the cylinder on the other side of the piston from the side into which the liquid is being forced by the user's weight to flow out of the cylinder via the other connecting and connecting tube and to inflate the liquid-filled cavity upon which the user's pressure in not currently being placed.

5. The apparatus of claim 1, wherein the wire windings comprise a multiple turn winding of insulated conducting wire around the outer circumference of the cylinder or magnetically associated with the cylinder in which the moving magnetic field of the piston induce an electrical current.

6. The apparatus of claim 1, wherein movement of the piston causes a flow of electric current in surrounding or magnetically associated conducting wire windings.

7. The apparatus of claim 1, wherein output current of the wire windings comprise alternating current.

8. The apparatus of claim 7, wherein frequency of the output current is governed at least in part by the rate at which the user of the apparatus takes steps while walking or running and by the number of magnetic flux fields produced by the magnetic piston or magnetic piston assembly and by the number of electrically conducting wire coils magnetically associated to the magnetic piston or magnetic piston assembly.

9. The apparatus of claim 7, wherein the output current is used to electrically charge one or more ultra-capacitors connected in series and/or parallel; or one or more batteries connected in series and/or parallel; or a combination of batteries and ultra capacitors connected in series or parallel or both in series and parallel.

10. The apparatus of claim 1, wherein the apparatus further comprises a charge storage device, wherein the electrical output of the wire windings charges the charge storage device and the charge on the charge storage device is in turn used to power an electrical or electronic device that the user of the apparatus may in addition be wearing being such additional apparatus as night vision goggles, radio transmitters and receivers, GPS location equipment or a means of illumination.

11. The apparatus of claim 1, wherein the apparatus further comprises a bridge rectifier component coupled to the wire windings for rectifying the output of the wire windings from alternating current to direct current.

12. The apparatus of claim 1, wherein the apparatus further comprises an electronic circuitry for controlling of the output of the bridge rectifier so as to prevent exceeding a maximum voltage or power level.

13. The apparatus of claim 1, wherein the apparatus is mounted on an object for attaching the apparatus close to the body of the user.

14. The apparatus of claim 13, wherein the apparatus generates current which is used to heat a resistance wire held in the interior lining of the object associated with the apparatus, temperature of the resistance wire being controlled by a thermistor, a temperature controlled impedance or a resistance controlling device.

15. The apparatus of claim 13, wherein the object is at least one of a footwear, a body suit, belt, vest, personal communication devices, radio, walkie-talkie, Night vision goggles, sun glasses, Powered telescopic rifle sights, Global positioning satellite receiving equipment, Flashlights, Personal computers and/or calculators, Laser designators, Personal music players, Video recorders, Cameras, Health monitoring equipment, Battery chargers, and a portable equipment.

16. The apparatus of claim 1, wherein said one or more pole pieces are magnetically conductive.

17. A method of generating electrical energy, the method comprising:
providing a footwear comprising a hydraulic system and an electromagnetic system, wherein
the hydraulic system converts energy generated by action of a biological subject into motion of a magnetic piston disposed in a sole of the footwear, wherein the magnetic piston comprises a plurality of magnets with similar poles facing each other and separated by one or more pole pieces, the magnets being axially magnetized along a longitudinal direction of the magnetic piston; and
the electromagnetic system harvests motion of the magnetic piston across electrically conductive insulated wire windings placed within magnetic field of the piston and are connected in series and wound alternately in clockwise and anti-clockwise directions; and
applying pressure to the hydraulic system, thereby generating electrical energy from the electromagnetic system.

18. The method of claim 17, wherein the magnetic piston movement across the surrounding wire windings causes a series of altering flux field to impinge on the windings thereby inducing an electromotive force in each winding.

19. The method of claim 18, wherein as the flux field increases an electro motive force is induced in one direction in the wire windings and as it decreases the electromotive force is induced in the opposite direction which causes the magnetic piston to induce an alternating current in the wire windings.

20. A method of generating electrical energy by a wearable apparatus in combination with a footwear, the apparatus comprising:
a liquid containing assembly, comprising:
a first compressible liquid-filled cavity,
a second compressible liquid-filled cavity,
a first connecting and conducting tube connected at its first end to the first compressible liquid-filled cavity allowing liquid flow from and to the first compressible liquid-filled cavity, the first connecting and conducting tube being liquid filled,
a second connecting and conducting tube connected at its first end to the second compressible liquid-filled cavity allowing liquid flow from and to the second compressible liquid-filled cavity, the second connecting and conducting tube being liquid filled,
a liquid-filled cylinder,
first sealing component, sealing the first end of the cylinder having a hollow connection point connected to the second end of the first connecting and conducting tube allowing the liquid to flow from and to the first connecting and conducting tube, a second sealing component, sealing the second end of the cylinder having a hollow connection point that is connected to the second end of the second connecting and conducting tube that allows liquid to flow from and to the second connecting and conducting tube,
an electrical generation assembly comprising:
a wearable piston disposed in a sole of the footwear, shaped to conform to the internal cross sectional shape of the cylinder, within the cylinder, free to move in a longitudinal direction along the cylinder, the piston comprising a plurality of magnets with similar poles facing each other and separated by one or more pole pieces, the magnets being axially magnetized along the longitudinal direction;
one or more electrically conductive insulated wire windings placed within the magnetic field of the piston and wound in alternate clockwise and anticlockwise directions and connected in series; and
one or more electrical components electrically connected to the windings;
wherein the method comprises compressing the first compressible liquid-filled cavity or the second compressible liquid-filled cavity to cause displacement of the piston causing the magnetic field of the piston to move at substantially right angle past the wire windings causing the magnetic flux within the wire windings to alter thereby generating an electromotive force.

21. A wearable apparatus for generating electric power, the apparatus comprising:
first and second compressible bladders;
a liquid containing column coupled between the first and second compressible bladders;
a magnetic piston disposed in the liquid containing column, the magnetic piston being shaped to conform with an internal cross section of the liquid containing column and movable in the liquid containing column along a longitudinal direction of the liquid containing column, wherein the magnetic piston comprises a plurality of magnets with similar poles facing each other and separated by one or more pole pieces, the magnets being axially magnetized along the longitudinal direction;
one or more wire windings disposed proximate the magnetic piston; and
an electric charge storage electrically coupled to said one or more wire windings.

22. The apparatus of claim 21, wherein said one or more pole pieces are magnetically conductive.

23. A footwear comprising the apparatus as recited in claim 21.

* * * * *